UNITED STATES PATENT OFFICE.

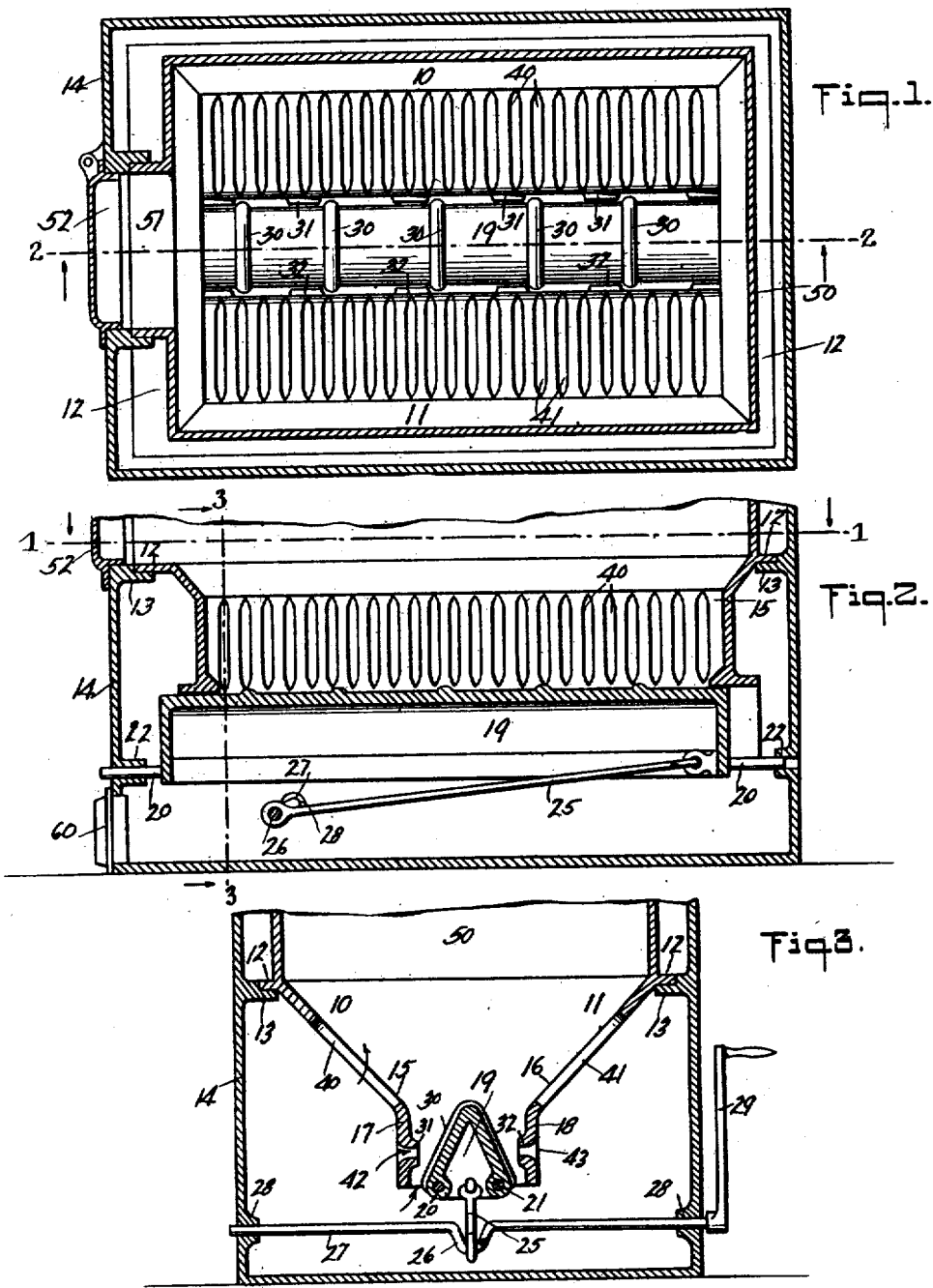

JOHN S. WASHBURN, OF SUFFERN, NEW YORK.

GRATE.

1,271,398.   Specification of Letters Patent.   Patented July 2, 1918.

Application filed December 22, 1917. Serial No. 208,452.

*To all whom it may concern:*

Be it known that I, JOHN S. WASHBURN, a citizen of the United States, and a resident of Suffern, in the county of Rockland and State of New York, have invented a new and Improved Grate, of which the following is a full, clear, and exact description.

The object of the invention is to provide a new and improved grate arranged to insure proper burning of the fuel especially coal and to permit of readily disposing of clinkers, lumps and other similar matter liable to lodge in the grate and obstructing shaking of the grate.

In order to accomplish the desired result use is made of fixed grate bars, a movable grate bar intermediate the said fixed grate bars, the said grate bars being provided at their opposite faces with projecting grinding members, and manually controlled means imparting reciprocating movement to the movable grate bar lengthwise thereof.

A practical embodiment of the invention is represented in the accompanying drawings forming a part of this specification, in which similar characters of reference indicate corresponding parts in all the views.

Figure 1 is a sectional plan view of the grate in position in a heater, the section being on the line 1—1 of Fig. 2;

Fig. 2 is a sectional side elevation of the same on the line 2—2 of Fig. 1; and

Fig. 3 is a transverse section of the same on the line 3—3 of Fig. 2.

The grate in its general construction is provided with two fixed grate bars 10 and 11 provided with supporting flanges 12 adapted to rest on flanges 13 formed on the inside of the heater casing 14 to properly support the said grate bars 10 and 11 within the heater casing at the lower or ash pit portion thereof. The fixed grate bars 10 and 11 are provided with downwardly and inwardly inclined members 15 and 16 which terminate in depending vertical members 17 and 18 spaced apart to provide room for a movable grate bar 19 intermediate the said members 17 and 18 of the fixed grate bars 10 and 11. The movable grate bar 19 is in the form of a peak in cross section and is provided at the lower ends of its sides with rods 20 and 21 mounted to slide in bearings 22 formed on the front and rear ends of the casing 14, as plainly indicated in Fig. 2.

The under side of the movable grate bar 19 is pivotally connected by a link or a pitman 25 with a crank 26 of a crank shaft 27 journaled in suitable bearings 28 arranged on the sides of the heater casing 14. One outer end of the crank shaft 27 is provided with a handle 29 to permit an operator to turn the crank shaft 27 with a view to impart a forward and rearward sliding movement to the movable grate bar 19.

In order to agitate the burning fuel and to dislodge or grind up any cinders that may lodge between the movable grate bar 19 and the members 17 and 18 of the fixed grate bars 10 and 11, the following arrangement is made: The movable grate bar 19 is provided with grinding members 30 in the form of ribs or similar projections extending along the sides and over the apex, and grinding members 31 and 32 are formed on the inner faces of the depending members 17 and 18 of the fixed grate bars 10 and 11 and which grinding members 31 and 32 coact with the grinding members 30 whenever the movable member 19 is caused to reciprocate by the operator manipulating the handle 29.

The inclined members 15 and 16 of the fixed grate bars 10 and 11 are provided with slots or openings 40 and 41 for the upward passage of air and the downward passage of ashes into the ash pit. The grinding members 31 and 32 of the depending members 17 and 18 are provided with openings 42 and 43 for the passage of air and ashes, and the passages are formed between the lower ends of the depending members 17 and 18 and the lower ends of the sides of the movable grate bar 19 to permit ashes to drop down into the ash pit and to allow air to pass upward to insure proper combustion of the fuel on the grate bars 10, 11 and 19. It will be noticed that by the arrangement described, the burning fuel can be readily distributed and agitated on imparting lengthwise movement to the movable grate bar 19, and any cinders and the like lodged between the movable grate bar 19 and the depending members 17 and 18 is readily ground up or dislodged to drop down into the ash pit.

The upper ends of the grate bars 10 and 11 lead into the fire pot 50 provided with an opening 51 in register with a door 52 arranged on the casing 14 for placing coal or other fuel into the heater. A door 60 is also arranged on the lower portion of the furnace for removing the ashes from the ash pit whenever it is desired to do so.

From the foregoing it will be seen that the grate is very simple in construction and can be readily kept free of ashes, cinders and the like to insure proper combustion of the fuel.

Having thus described my invention, I claim as new and desire to secure by Letters Patent:—

1. A grate, comprising fixed and spaced grate bars, a movable grate bar between the said fixed grate bars, the said grate bars being provided on their opposing faces with projecting grinding members, and manually controlled means inparting reciprocating movement to the movable grate bar lengthwise thereof.

2. A grate, comprising fixed grate bars spaced apart and having perforate portions inclined toward each other and terminating at their lower ends in approximately vertical portions, a movable grate bar intermediate the said vertical portions of the fixed grate bar and approximately peak shape in cross section, and means for imparting a reciprocating motion to the movable grate bar lengthwise thereof.

3. A grate, comprising fixed grate bars spaced apart and having perforate portions inclined toward each other and terminating at their lower ends in approximately vertical portions, a movable grate bar intermediate the said vertical portions of the fixed grate bar and approximately peak-shape in cross section, fixed rods on which the said movable grate bar is mounted to slide, and means for imparting a reciprocating motion to the movable grate bar lengthwise thereof.

4. A grate, comprising fixed grate bars spaced apart and having perforate portions inclined toward each other and terminating at their lower ends in approximately vertical portions, a movable grate bar intermediate the said vertical portions of the fixed grate bar and approximately peak shape in cross section, fixed rods on which the said movable grate bar is mounted to slide lengthwise, a crank shaft under the control of an operator, and a link connecting the said movable grate bar with the crank of the said crank shaft.

5. A grate, comprising fixed grate bars spaced apart and having perforate portions inclined toward each other and terminating at their lower ends in approximately vertical portions, a movable grate bar intermediate the said vertical portions of the fixed grate bar and approximately peak shape in cross section, the faces of the said movable grate bar being provided with integral grinding members, and the faces of the said vertical portions of the fixed grate members being provided with integral grinding members, and means for imparting a reciprocating motion to the movable grate bar lengthwise thereof.

JOHN S. WASHBURN.

Copies of this patent may be obtained for five cents each, by addressing the "Commissioner of Patents, Washington, D. C."